United States Patent
Hostetter et al.

(10) Patent No.: US 12,287,058 B1
(45) Date of Patent: Apr. 29, 2025

(54) ADJUSTABLE SUPPORT STAND ASSEMBLY AND CONNECTION SYSTEM

(71) Applicant: Bloomfield Manufacturing Co., Inc., Bloomfield, IN (US)

(72) Inventors: Robbie D. Hostetter, Bloomfield, IN (US); E. Austin Harrah, Bloomfield, IN (US)

(73) Assignee: BLOOMFIELD MANUFACTURING CO. INC., Bloomfield, IN (US)

( * ) Notice: Subject to any disclaimer, the term of this patent is extended or adjusted under 35 U.S.C. 154(b) by 0 days.

(21) Appl. No.: 18/497,240

(22) Filed: Oct. 30, 2023

(51) Int. Cl.
*F16M 11/22* (2006.01)
*B66F 3/00* (2006.01)
*F16M 11/04* (2006.01)

(52) U.S. Cl.
CPC .............. *F16M 11/22* (2013.01); *B66F 3/00* (2013.01); *F16M 11/046* (2013.01); *F16M 2200/028* (2013.01)

(58) Field of Classification Search
CPC ......... F16M 2200/028; F16M 2200/08; F16M 11/22; F16M 11/046; F16M 11/28; F16M 11/30; F16M 11/32; F16M 11/34; F16M 11/242; F16M 11/245
USPC .... 248/163.1, 431, 432, 165, 166, 168, 169, 248/171, 439, 173
See application file for complete search history.

(56) References Cited

U.S. PATENT DOCUMENTS

| | | | | |
|---|---|---|---|---|
| 3,078,063 A | * | 2/1963 | Frankl | A47B 13/023 |
| | | | | D6/708.23 |
| 3,524,616 A | * | 8/1970 | Marschak | A47F 5/04 |
| | | | | 211/205 |
| 4,728,067 A | * | 3/1988 | Steinmetzer | F16B 12/52 |
| | | | | 248/188.7 |
| 4,915,332 A | * | 4/1990 | Ouellette | A63D 15/10 |
| | | | | 211/172 |
| 5,222,705 A | * | 6/1993 | Gibran | F16M 11/046 |
| | | | | 403/328 |
| 5,915,672 A | | 6/1999 | Dickey | |
| 7,147,211 B2 | | 12/2006 | Porter | |
| 9,380,904 B2 | * | 7/2016 | Peek | F16M 11/28 |
| 9,725,286 B1 | | 8/2017 | Christopher, Jr. | |
| 10,271,641 B2 | * | 4/2019 | Rassat | A47B 13/023 |
| 10,738,938 B2 | | 8/2020 | Becker | |
| 11,028,962 B1 | | 6/2021 | Barrow | |

* cited by examiner

*Primary Examiner* — Alfred J Wujciak
(74) *Attorney, Agent, or Firm* — Brannon Sowers & Cracraft PC

(57) ABSTRACT

A jack stand includes a stand body defining a stand axis extending between a first axial stand body end and a second axial stand body end. The stand body further includes an outer stand component having an assembly through-bore and a plurality of radially extending openings, and an inner stand component within the assembly-through bore, and including therein a plurality of axially extending leg channels. A plurality of legs each include a retention lug within one of the plurality of radially extending openings and an edge opposite the respective one of the retention lugs and within one of the plurality of axially extending leg channels. The jack stand is collapsible and adjustable to a service arrangement to support a lifted body such as a vehicle in an off-highway environment.

19 Claims, 5 Drawing Sheets

ADJUSTABLE SUPPORT STAND ASSEMBLY AND CONNECTION SYSTEM

TECHNICAL FIELD

The present disclosure relates generally to a support stand and a stand assembly for supporting heavy objects, more particularly to a support stand for vehicles, equipped with a connection system.

BACKGROUND

Vehicle jacks are devices responsible for lifting heavy objects, such as vehicles, boats, etc., off of a working surface for easier accessibility to the undercarriage or the chassis or for extraction when stuck for example. By utilizing the principle of mechanical advantage, the vehicle jack enables the user to relatively easily elevate heavier objects off of a working surface while employing a relatively small amount of force. Although vehicle jacks can be a reliable means of support, they may slip for several reasons. For instance, having inadequate ground stability due to soft terrain such as mud, can compromise the vehicle jack's integrity, undermining its stability or elements may fail. Failure of the vehicle jack to support the weight of an object having its undercarriage accessed, for example, could result in injury to a user or damage to the vehicle.

Be it a hydraulic vehicle jack or some other type of device for lifting the vehicle, once lifted, a separate jack stand may be utilized as a support system for the vehicle jack to reinforce the elevated vehicle in a stable position. Jack stands of an adjustable type are positioned under a frame and supported upon a stable surface where the height of the jack stand may then be adjusted to a desired elevation. Once positioned, the jack stand may be secured via a locking device, maintaining the desired elevation and preventing unexpected descents. Despite the intended purpose of enhancing the stability of the lifted object, known jack stands have been observed to fail under certain conditions.

One known collapsible jack stand is set forth in U.S. Pat. No. 11,028,962B1 to Barrow and LaPelle. In the Barrow and LaPelle patent, a jack stand includes a saddle supported above the ground by an upright member and a base with a brace member to help support the upright member. The jack stand is characterized as being designed to be pivoted downward and folded into a flattened configuration when not in use. While it is probable the stand has practical applications, it is important to acknowledge the opportunity for ongoing alternative solutions.

SUMMARY

In one aspect, a jack stand includes a stand body defining a stand axis extending between a first axial stand body end and a second axial stand body end. The stand body further includes an outer stand component having an assembly through-bore extending from the first axial stand body end toward the second axial stand body end, and a plurality of radially extending openings in communication with the assembly through-bore. The stand body further includes an inner stand component within the assembly-through bore, and including therein a plurality of axially extending leg channels. The jack stand further includes a plurality of legs each having a first leg end and an opposite second leg end, and the first leg end having a retention lug within one of the plurality of radially extending openings and an edge opposite the respective one of the retention lugs and within one of the plurality of axially extending leg channels.

In another aspect, a stand assembly includes a support head, an outer stand component having an assembly through-bore extending between a first axial stand body end and a second axial stand body end, and a plurality of radially extending openings in communication with the assembly through-bore. The stand assembly further includes an inner stand component disposed within the assembly-through bore, and includes therein a plurality of axially extending leg channels and a plurality of legs. Each of the plurality of legs includes a first leg end, and a substrate-contacting second leg end, each respective first leg end having a retention lug, and an edge opposite to the retention lug. The lug and edge being patterned for simultaneous mated engagement within, respectively, one of the plurality of radially extending openings and one of the plurality of axially extending leg channels.

In still another aspect, a connector assembly for vertical load support includes an outer component having an elongate tubular shape and defining an axis. The outer component having formed therein an assembly through-bore extending from a first axial component end to a second axial component end. The connector assembly further includes a plurality of radially extending openings and a radially extending through-hole, an inner component positionable coaxially with the outer component, including a first inner component end and a second inner component end and having formed therein a plurality of axially extending leg channels, and a plurality of radially extending apertures. The connector assembly further includes a plurality of legs each having a first leg end and an opposite second leg end, and the first leg end having a retention lug within one of the plurality of radially extending openings and an edge opposite the respective one of the retention lugs and within one of the plurality of axially extending leg channels. The connector assembly still further includes a pin positionable in one of the radially extending apertures and the radially extending through hole, and is adjustable to any other of the radially extending apertures to vary an axial height of the outer component relative to the inner component end.

DETAILED DESCRIPTION

Figure 1:
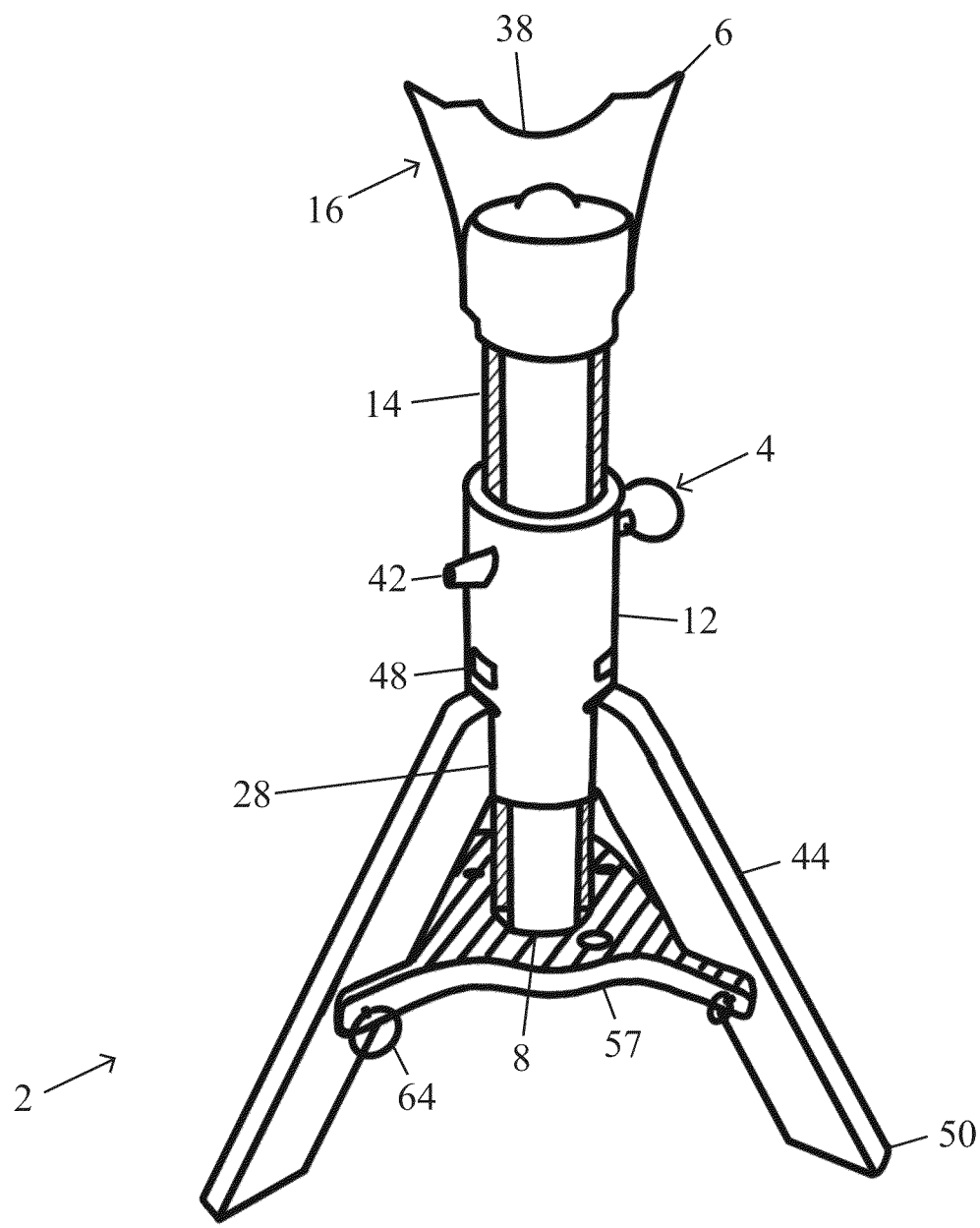
FIG. 1 is a front view of a jack stand according to one embodiment
Figure 2:
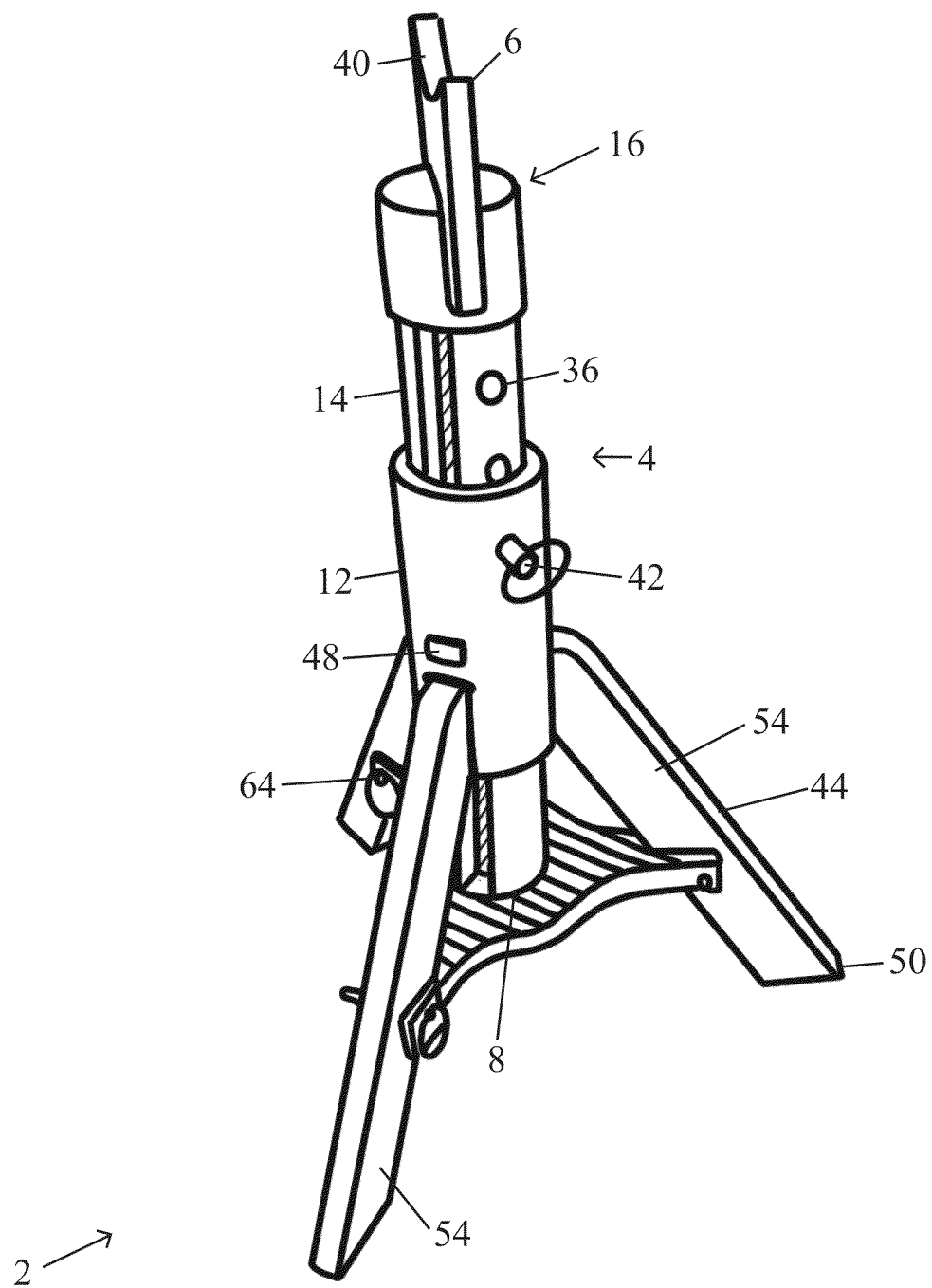
FIG. 2 is a perspective view of a jack stand according to one embodiment
Figure 3:
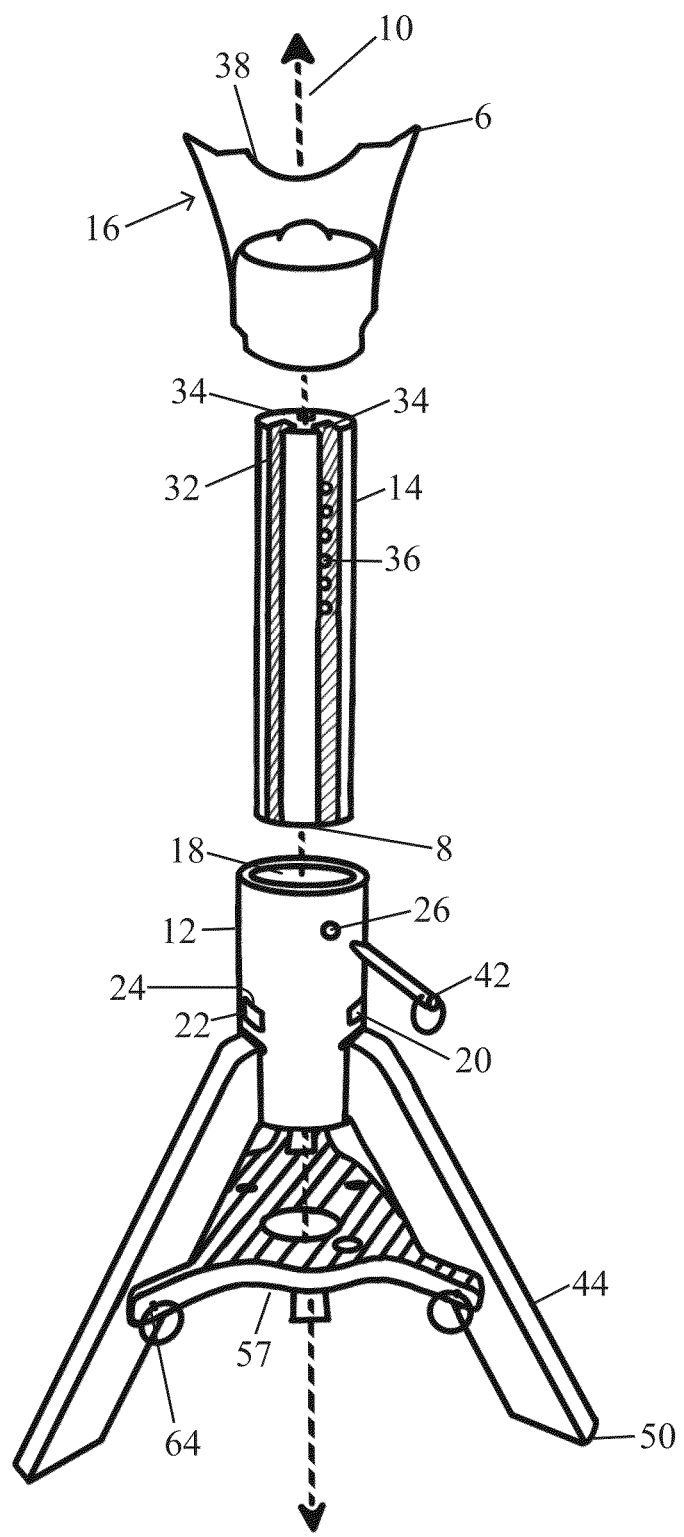
FIG. 3 is a front view of a jack stand assembly according to one embodiment

Referring to FIGS. 1-3, illustrated is a jack stand 2, according to one embodiment. Jack stand 2 includes a stand body 4 having a first axial stand body end 6 and a second axial stand body end 8. Stand body 4 may generally be made of a metallic material such as aluminum, although the present disclosure is not thereby limited. Stand body 4 includes a stand axis 10 defining an axial direction, along which jack stand 2 may be adjusted to vary an axial height thereof.

According to certain aspects of the present disclosure, stand body 4 includes an outer stand component 12, an inner stand component 14, and a support head 16. Outer stand component 12 includes a generally cylindrical structure and is concentrically positioned around stand axis 10, having an assembly through-bore 18 extending between first axial stand body end 6 and second axial stand body end 8. Outer stand component 12 further includes a plurality of radially extending openings 20 circumferentially positioned within outer stand component 12 and in communication with assembly through-bore 18. Each respective opening 20 may include two parallel axially spanning plane surfaces 22 relative to stand axis 10 and two circumferentially spanning plane surfaces 24 relative to stand axis 10. Each opening 20 may have a rectangular shape such as a square or rectangle. Additionally, outer stand component 12 includes a radially extending through-hole 26 positioned axially toward first axial stand body 6 relative to openings 20. Outer stand component 12 further includes a plurality of leg insertion recesses 28 circumferentially arranged relative to stand axis 10. Each leg insertion recess 28 includes opposing edges 30 extending from the second axial stand body end 8 in a first axial direction. Leg insertion recesses 28 are in circumferential alignment with each opening 20, with the radially extending openings 20 being axially positioned toward the first axial stand body end 6.

As shown, jack stand 2 is also equipped with inner stand component 14 positionable coaxially within assembly-through bore 18 of outer stand component 12. In accordance with outer stand component 12, inner stand component 14 is also generally cylindrical and concentrically positioned around stand axis 10. Inner stand component 14 includes a plurality of axially extending leg channels 32 having a circumferential arrangement, which may be full length and form a circumferentially distributed array of channels 34 at first axial stand body end 6. A longitudinally arranged plurality of radially extending apertures 36 are disposed in inner stand component 14, and may open within one axially extending leg channel. Opposite ends of apertures 36 may open at locations circumferentially between two axially extending leg channels. In one embodiment, there may be 6 radially extending apertures 36 opening within a channel 32, although the present disclosure is not thereby limited. In other embodiments, apertures 36 might not be positioned within a leg channel at all.

Adjacent array of channels 34 and coupled to first axial stand body end 6, support head 16 is affixed to stand body 4. Support head 16 may include an inversed annular arch 38, having a midpoint that aligns with stand axis 10 and a support surface 40 which extends the length of inversed annular arch 38. While employing jack stand 2, support surface 40 is configured to engage the vehicle or other structure being supported. Although the present disclosure illustrates support head 16 as being a distinct component, it should be appreciated that the separation is not meant to be exclusive and alternative support head strategies may be implemented. An example is altering inner stand component 14 to further incorporate the support surface.

Positionable within radially extending through-hole 26 and radially extending apertures 36 is a height-setting pin 42. Height-setting pin 42 permits the variable axial heights of inner stand component 14 within outer stand component 12 based on a desired elevation. While the present description illustrates the use of a single radially extending through-hole 26 and a height-setting pin 42, it should be appreciated that the number shown is not meant to be exclusive and alternative strategies for positioning the height are within the scope of the present disclosure.

Figure 4:
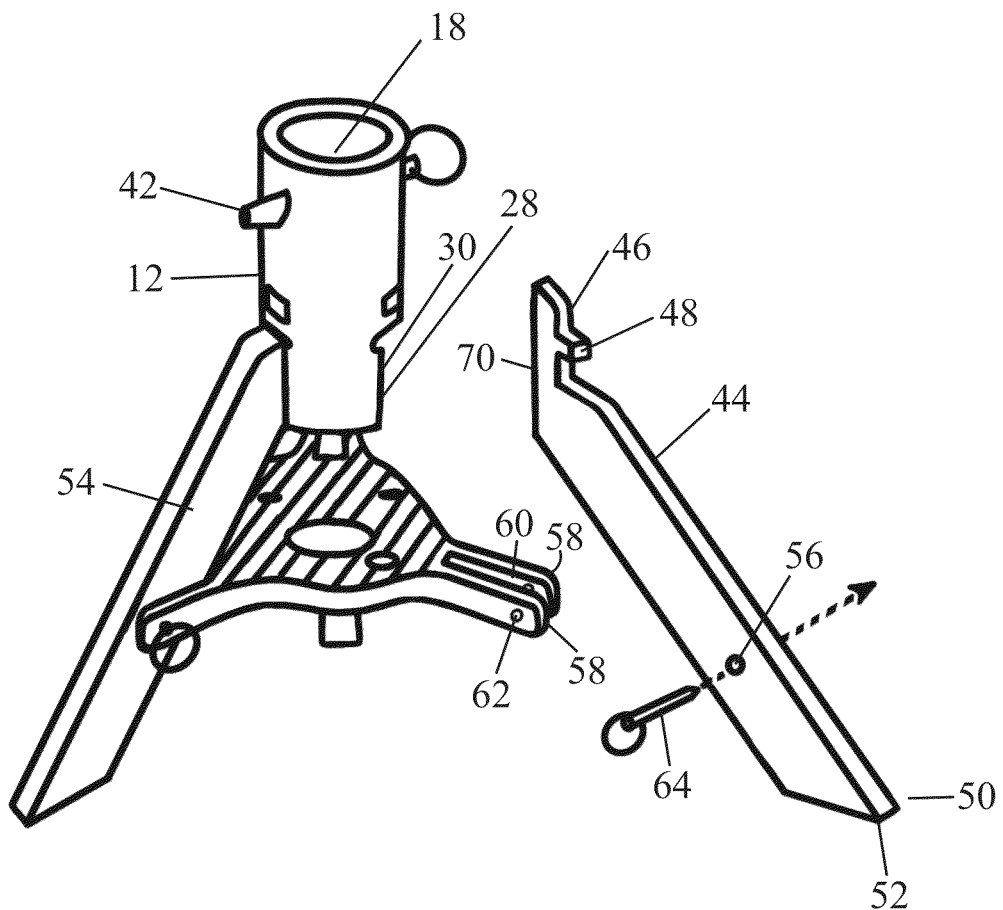
FIG. 4 is a front view of an outer component and leg connection according to one embodiment

Referring now to FIG. 4, jack stand 2 additionally includes a plurality of legs 44 extending from and coupled to stand body 4. Legs 44 include a first leg end 46 having a retention lug 48, a second leg end 50 having a substrate-contacting surface 52, and planar opposite surfaces 54 which extend from first leg end 46 to second leg end 50. Each leg 44 may have a uniform thickness throughout defined between planar opposite surfaces 54. Legs 44 are positioned in a pyramidal arrangement wherein a portion of each leg 44 is positionable to be oriented diagonally, with second leg end 50 extending outward from stand axis 10. The pyramidal arrangement enables both outer stand component 12 and inner stand component 14 to be located radially inward of second leg end 50. In one embodiment, legs 44 may include 3 legs but numbers larger are also considered. Legs 44 may further include a leg support opening 56 located in the diagonally oriented portion which extends through both planar opposite surfaces 54, which will subsequently be discussed in further detail.

Jack stand 2 further includes a leg support member 57 having leg receptacles 58 which radially extend to define leg slots 60 therein. Leg support member 57 is positionable axially spaced from outer component 12 and inner component 14 and centrically located. Furthermore, leg support member 57 is configured to be coupled to each leg 44 so as to support the pyramidal arrangement. Each leg slot 60 includes two inner opposite facing surfaces configured to abut both planar opposite surfaces 54 of each leg 44 when the jack stand 2 is employed. Leg receptacles 58 may further include a support hole 62 which extends in a perpendicular direction relative to stand axis 10. When legs 44 are disposed within each leg slot 60, a plurality of leg support pins 64 may extend though each of both, the leg support opening 56 and the slot holes 62, securing the diagonal portion of each leg. The number of leg slots 60, leg insertion recesses 28, and openings 20, may correspond to the number of legs 44.

Figure 5:
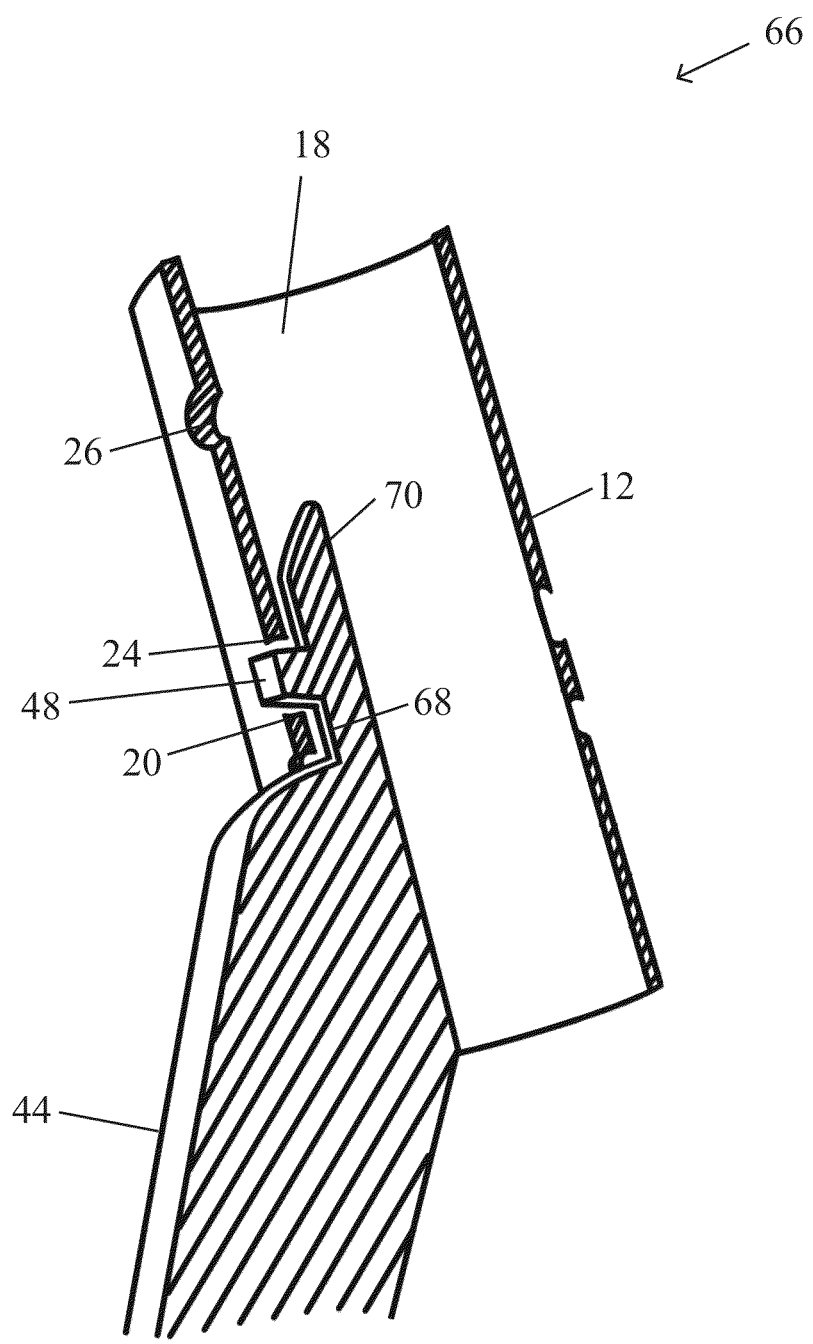
FIG. 5 is a sectioned view of a connection assembly according to one embodiment.

Referring now also to FIG. 5, illustrated is a connector assembly 66 for the outer component 12 and legs 44 to support the vertical load when jack stand 2 is engaged. While the present disclosure discusses the use of stand components in a jack stand to accomplish the connection, the connector assembly 66 may also be achieved using equivalent components in an application other than as part of a jack stand. Each retention lug 48 is adjoined by a cutout 68 which includes a flat end surface parallel to stand axis 10. Retention lugs 48 further project in a first direction perpendicular to stand axis 10 and at an angle less than 90 degrees relative to the respective diagonal portions of each leg 44. When assembled, legs 44 extend through a corresponding leg insertion recess 28, enabling the planar opposite surfaces 54 to be in communication with the opposing edges 30 of the leg insertion recesses 28 such that they are laterally adjacent. While having this placement, each retention lug 48 faces the parallel axially spanning plane surfaces 22 and the circumferentially spanning plane surfaces 24. Further, when each retention lug 48 is disposed within its corresponding opening 20, a guiding edge 70 located on a side opposite the respective one of retention lugs 48 is positioned within one leg channel 32.

INDUSTRIAL APPLICABILITY

Jack stand 2 is intended to be collapsible and lightweight for ease of handling and transport. The collapsible structure of jack stand 2 permits stowage within a carrying case on-board a vehicle. This could be a significant consideration for off-road users seeking additional stability due to off-road terrain being unstable or uneven. For instance, when a tire requires attention the presently disclosed jack stand 2 assembly may prove to be practical. Following the use of a vehicle jack to lift the vehicle in need of attention, jack stand 2 may be employed. The assembly is adjustable from a disassembled arrangement to a service arrangement, and may be disassembled and stored in a carrying case or the like when not in use.

Referring to the drawings generally, it will be recalled that jack stand 2 includes a plurality of legs, leg support member 57, and stand body 4 having inner stand component 14, outer stand component 12, and support head 16. Installation includes positioning inner stand component 14 within assembly through-bore of outer stand component 12, ensuring each axially extending leg channel 32 is aligned with a respective leg insertion recess 28 of outer stand component 12. Then, each leg may be inserted into a respective leg insertion recess 28, such that guiding edge 70 abuts a leg channel 32 and retention lug 48 extends through a respective radially extending opening 20, forming the service arrangement. When in the service arrangement the plurality of legs are arranged in a pyramidal pattern and each is coupled to both inner stand component 14 and outer stand component 12 via the simultaneous engagement of the respective lugs 48 and guiding edges 70. As will be apparent from the description herein, the respective lugs 48 and edges 70 may be patterned for simultaneous mated engagement within, respectively, one of the plurality of radially extending openings 20 and one of the plurality of axially extending leg channels 32. Leg support member 57 is then aligned accordingly and each leg is positioned within a respective leg slot 60 and fastened using a support pin 64. A support head 16 may additionally be attached to inner stand component 14 in order to engage the vehicle. In some embodiments, support head 16 may be formed of a different material than other components of jack stand 2. For example, support head 16 might be steel and some or all of the other components of jack stand 2 aluminum. To secure jack stand 2 at a desired axial height, height-setting pin 42 extends through both outer stand component 12 and inner stand component 14. Height-setting pin 42 is adjustable to any other radially extending aperture 36 to vary an axial height of outer stand component 12 relative to inner stand component 14.

Jack stand 2 may also be adjusted from the service arrangement to the disassembled arrangement when no longer in use. Following the assembly of jack stand 2, the presently disclosed sequence may be reversed. In some circumstances two or even more of the jack stands described herein might be used, depending upon application. Moreover, the use of jack stand 2 or components thereof is not limited to vehicles but may also apply to tents, scaffolding, construction, or other mechanical systems. Embodiments are contemplated where jack stand 2 is used as an adjustable-height support for a speaker or an electronic display. Connector assembly 66 may be used as a height-adjustable support or coupling apparatus without limitation in any system where vertical load support is desired.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A jack stand comprising:
   a stand body defining a stand axis extending between a first axial stand body end and a second axial stand body end;
   the stand body further including an outer stand component having an assembly through-bore extending from the first axial stand body end toward the second axial stand body end, and a plurality of radially extending openings in communication with the assembly through-bore;
   the stand body further including an inner stand component within the assembly-through bore, and including therein a plurality of axially extending leg channels; and
   a plurality of legs each including a first leg end and an opposite second leg end, and the first leg end having a retention lug within one of the plurality of radially extending openings and an edge opposite the respective one of the retention lugs and within one of the plurality of axially extending leg channels.

2. The stand of claim 1 wherein the axially extending leg channels span a full axial length of the inner stand component, and form an array circumferential of the stand axis, and further comprising a support head coupled to the first axial stand body end.

3. The stand of claim 1 wherein the inner stand component further includes a longitudinally arranged plurality of radially extending apertures each opening within one of the plurality of axially extending leg channels.

4. The stand of claim 1 wherein the plurality of radially extending openings are circumferentially positioned within the outer stand component and each radially extending opening includes two parallel axially spanning plane surfaces relative to the stand axis and two circumferentially spanning plane surfaces relative to the stand axis.

5. The stand of claim 1 further comprising a height-setting pin extending through both a radially extending through-hole in the outer stand component and one of the plurality of radially extending apertures in the inner component.

6. The stand of claim 1 further comprising a leg support member spaced axially from the outer stand component and the inner stand component, and the leg support member being centrically located and coupled to each of the plurality of legs so as to support the plurality of legs in a pyramidal arrangement.

7. The stand of claim 1 wherein the outer stand component further includes a plurality of leg insertion recesses having opposing edges extending from the first axial stand body end toward the second axial stand body end, the radially extending openings being located axially to the leg insertion recesses toward the second axial stand body end and in circumferential alignment with the leg insertion recesses.

8. The stand of claim 7 wherein:
   the plurality of legs includes a total of 3 legs; and
   a portion of each of the 3 legs are diagonally oriented extending outward of the stand axis.

9. The stand of claim 7 further including planar opposite surfaces on each of the plurality of legs that extend from the first leg end to the second leg end, and wherein a cutout adjoins the respective lug in each of the plurality of legs;

wherein the lug projects in a first direction perpendicular to the stand axis and at an angle less than 90 degrees relative to the respective portions of the 3 legs, the lug further including a flat end surface parallel to the stand axis.

10. The stand of claim 9 wherein each of the plurality of legs are disposed within one of the leg insertion recesses, respectively, having each of the planar opposite surfaces of the plurality of legs facing the opposing edges of the leg insertion recesses such that they are laterally adjacent and the lug is adjacent to the parallel axially spanning plane surfaces and the circumferentially spanning plane surfaces.

11. The stand of claim 1 wherein the inner stand component and the outer stand component are generally cylindrically structured being concentrically positioned around the stand axis and radially inward of the second leg end.

12. A stand assembly comprising:
 a support head;
 an outer stand component having an assembly through-bore extending between a first axial stand body end and a second axial stand body end, and a plurality of radially extending openings in communication with the assembly through-bore;
 an inner stand component disposed within the assembly-through bore, and including therein a plurality of axially extending leg channels; and
 a plurality of legs, each including a first leg end, and a substrate-contacting second leg end, each respective first leg end having a retention lug, and an edge opposite to the retention lug;
 the lug and edge being patterned for simultaneous mated engagement within, respectively, one of the plurality of radially extending openings and one of the plurality of axially extending leg channels.

13. The stand assembly of claim 12 wherein the assembly is adjustable from a disassembled arrangement to a service arrangement, and wherein in the service arrangement the plurality of legs are arranged in a pyramidal pattern and each is coupled to both the inner component and the outer component via the simultaneous mated engagement of the respective lugs and edges.

14. The stand of claim 13 wherein the inner stand component further includes a longitudinally arranged plurality of radially extending apertures opening within one of the plurality of axially extending leg channels.

15. The stand of claim 12 wherein:
 the plurality of radially extending openings are circumferentially positioned within the outer stand component and each radially extending opening defines a rectangular shape; and
 the stand further comprising a radially extending through-hole within the outer stand component and a height-setting pin positionable in the radially extending through hole and one of the plurality of radially extending apertures in the inner component.

16. The stand of claim 12 wherein the outer stand component further includes a plurality of leg insertion recesses located axially to the plurality of radially extending openings, and in circumferential alignment with the radially extending openings.

17. The stand of claim 12 wherein:
 the inner stand component and the outer stand component are generally cylindrically structured being concentrically positioned around a stand axis and radially inward the second leg end;
 the plurality of legs includes a total of 3 legs; and
 the 3 legs are positionable to extend diagonally outward of the stand axis and axially toward the second axial stand body end.

18. The stand of claim 17 wherein each of the plurality of legs includes planar opposite surfaces that extend from a first leg end to a second leg end, and a cutout adjoining the lug.

19. The stand of claim 18 wherein each of the plurality of legs has a uniform thickness throughout extending between the respective planar opposite surfaces.

* * * * *